(12) United States Patent
Haritou et al.

(10) Patent No.: US 12,152,709 B2
(45) Date of Patent: Nov. 26, 2024

(54) APPARATUS AND METHOD FOR SEALING AND MONITORING A BOLTED FLANGE JOINT

(71) Applicants: Christos S. Haritou, New Marske (GB); Alan Fada, Washington (GB)

(72) Inventors: Christos S. Haritou, New Marske (GB); Alan Fada, Washington (GB)

( * ) Notice: Subject to any disclaimer, the term of this patent is extended or adjusted under 35 U.S.C. 154(b) by 0 days.

(21) Appl. No.: 17/420,399

(22) PCT Filed: Jan. 6, 2020

(86) PCT No.: PCT/GB2020/050016
§ 371 (c)(1),
(2) Date: Jul. 2, 2021

(87) PCT Pub. No.: WO2020/141333
PCT Pub. Date: Jul. 9, 2020

(65) Prior Publication Data
US 2022/0082190 A1    Mar. 17, 2022

(30) Foreign Application Priority Data
Jan. 4, 2019   (GB) ...................... 1900131

(51) Int. Cl.
*F16L 23/16*    (2006.01)
*E04H 12/08*    (2006.01)
(Continued)

(52) U.S. Cl.
CPC ............ *F16L 23/16* (2013.01); *E04H 12/085* (2013.01); *F16L 23/036* (2013.01);
(Continued)

(58) Field of Classification Search
CPC ......... F16L 23/02; F16L 23/16; F16L 23/006; F16L 2201/30; F16L 23/167; E04H 12/085
See application file for complete search history.

(56) References Cited

U.S. PATENT DOCUMENTS

2013/0327412 A1   12/2013  Degeorge
2016/0258832 A1   9/2016   Haritou

FOREIGN PATENT DOCUMENTS

DE              20006750 U1 *  6/2000  .............. F16B 43/00
DE       20 2018 100604 U1      3/2018
(Continued)

OTHER PUBLICATIONS

International Search Report, May 15, 2020, mailed May 28, 2020, PCT/GB2020/050016, EPO.

*Primary Examiner* — Zachary T Dragicevich
*Assistant Examiner* — James A Linford
(74) *Attorney, Agent, or Firm* — Kinney & Lange, P.A.

(57) ABSTRACT

A bolted flange joint sealing and monitoring apparatus with the bolting flange joint having two flanges abutting one another at an interface and the abutting flanges providing an inner surface and an outer surface. A layer of sealant applied to the interface and an area of the abutting flanges. An inner and outer surface of sheet material providing an air space. A sealant forming an air tight space. A vacuum source in communication with the air tight space and a vacuum monitor monitoring the status of a vacuum in the air tight space.

18 Claims, 12 Drawing Sheets

(51) Int. Cl.
*F16L 23/036* (2006.01)
*G01M 3/28* (2006.01)
*F03D 13/20* (2016.01)

(52) U.S. Cl.
CPC ........... *G01M 3/2853* (2013.01); *F03D 13/20* (2016.05); *F05B 2240/912* (2013.01); *F05B 2260/301* (2013.01); *F16L 2201/30* (2013.01)

(56) References Cited

FOREIGN PATENT DOCUMENTS

| | | | | |
|---|---|---|---|---|
| EP | 1 318 300 | A1 | 6/2003 | |
| EP | 1889987 | A1 * | 2/2008 | ............. E04H 12/08 |
| EP | 3926165 | A4 * | 12/2021 | ........... E04H 12/085 |
| JP | 08021591 | A * | 1/1996 | ............. F16L 23/02 |
| WO | WO-2009121594 | A2 * | 10/2009 | ............. B25B 21/00 |

* cited by examiner

APPARATUS AND METHOD FOR SEALING AND MONITORING A BOLTED FLANGE JOINT

FIELD OF THE INVENTION

The present invention relates to bolted flange joints and in particular to an apparatus and method for sealing such a joint and which provides for monitoring of the integrity of the seal and the joint.

BACKGROUND OF THE INVENTION

Bolted flange joints are used widely, usually for joining together hollow structures such as sections of pipes or tube. Often hollow structures have a circular cross-section although this is not always the case.

Wind turbine towers are often made from a plurality of hollow structural sections that are mounted one on top of another and fastened together. Whilst fastening of one hollow structural section to another may be by welding, a bolted flange joint is often preferred.

In a wind turbine tower the bolted flange joints must be capable of withstanding very large forces. As a result flanges are typically between 50 and 170 mm thick and bolts be fastened with great torque.

In a bolted flange joint of a wind turbine towers a series of holes is provided in each flange, the holes in each flange are aligned and bolts passed through aligned holes in adjacent flanges.

For the continues safe operation of the wind turbine it is essential that if there is a fault at one of the bolted flange joints it is detected early so that the fault may be repaired. A typical fault would involve a bolt failing. If one bolt fails, the bolts immediately adjacent the failed bolt are placed under an increased load, and if one of those bolts fails the bolts immediately adjacent those failed bolts are placed under a still greater load.

The bolted flange is often covered externally with a steel cover. Such a cover can protect the joint from water penetration. Wind turbines are often located in harsh environments, such as at sea or in mountainous areas, and may be exposed to driving rain, and when offshore, sea water in the form of waves and sea spray. If the joint is penetrated the bolts could be caused to corrode.

In order to detect faults in bolted flanges of wind turbine towers a rigorous visual inspection regime is followed, with technicians entering the wind turbine towers and inspecting the joints at regular intervals. If a failed or failing bolt or water ingress Is detected, remedial action is taken. This may comprise replacing suspect bolts and/or fixing the outer cover.

It is possible to monitor bolts remotely. However, to date this has involved monitoring each bolt of the flange independently. The cost of such monitoring equipment has to date been considered prohibitive and hence a manual inspection regime is preferred in the industry.

It would be desirable to provide an improved apparatus and method for sealing a bolted flange. It would also be desirable to provide an improved apparatus and method for monitoring the integrity of a bolted flange, and in particular the seal of a sealed bolted flange.

SUMMARY OF THE INVENTION

According to the invention there is provided a bolted flange joint sealing and monitoring apparatus, the bolted flange joint comprising two flanges abutting one another at an interface, each flange having a series of holes therein, the holes of the two flanges of the joint aligned and receiving bolts therein, and the abutting flanges providing an inner surface and an outer surface, the sealing and monitoring apparatus including:

a. a layer of sealant applied to the interface and an area of the abutting flanges surrounding the interface on at least one of the inner and outer surfaces;

b. and on at least one of the inner and outer surfaces a first layer of sheet material adapted to provide an air space and overlying the following step a;

c. a second layer of sheet material overlying the first layer of sheet material;

d. a fluid impermeable sealant overlying the second layer of sheet material;

wherein an air tight space is formed around the first layer of sheet material, the apparatus further including a vacuum source, and wherein the said air tight space is in fluid communication with the vacuum source, the apparatus further including vacuum monitoring means configured to monitor the status of a vacuum created in the air tight space.

The bolted flange joint sealing and monitoring apparatus may further include a third layer of sheet material situated between the first and second layers of sheet material.

The third layer of sheet material may be a fluid impervious foil. The foil may be an aluminium foil, or a plastics foil.

The bolted flange joint sealing and monitoring apparatus may further comprise a fourth layer of sheet material situated between the first layer of sheet material and the flange surface or a layer of sealant on the flange surface, wherein the fourth layer of sheet material is attached to the flange surface or sealant by adhesive.

The fourth layer of sheet material may be either covered on opposing faces thereof with adhesive, or is impregnated with adhesive such that the opposing faces thereof have adhesive thereon.

At least one face of the third layer of sheet material may be covered with adhesive.

Advantageously, the second layer of sheet material is a cloth, and the cloth may be a glass fibre cloth.

Preferably, one side of the second layer of sheet material is covered with adhesive.

It is preferred that the peripheral edge of the first layer lies inside the peripheral edge of the fluid impermeable sealant overlying the second layer of sheet material.

Advantageously, the peripheral edge of the second layer of sheet material extends beyond or is co-terminus with the peripheral edge of the first layer of sheet material.

The peripheral edge of the third layer of sheet material may extend beyond or may be co-terminus with the peripheral edge of the first layer of sheet material.

It is preferred that the peripheral edge of the fourth layer of sheet material extends beyond or is co-terminus with the peripheral edge of the first layer of sheet material.

According to a second aspect of the invention there is provided a structure comprising a bolted flange joint, the bolted flange joint being provided with bolted flange joint sealing and monitoring apparatus according to the first embodiment of the invention.

The structure may comprise a plurality of bolted flange joints, each bolted flange joint being provided with at least one bolted flange joint sealing and monitoring apparatus according to any the first aspect of the invention, wherein each apparatus provides an isolated air tight pocket.

According to a third aspect of the invention there is provided a method of fabricating a bolted flange joint sealing and monitoring apparatus on a bolted flange joint, the bolted flange joint comprising two flanges abutting one another at an interface, each flange having a series of holes therein, the holes of the two flanges of the joint aligned and receiving bolts therein, and the abutting flanges providing an inner surface and an outer surface comprising the steps of:

e. Preparing inner and outer surfaces of abutting flanges of a bolted flange joint in and area around the interface the bolted flange joint;
f. Applying a layer of sealant to the interface and an area of the abutting flanges surrounding the interface on at least one of the inner and outer surfaces; and on at least another of the inner and outer surfaces,
g. Attaching a first layer of sheet material adapted to provide an air space overlying the interface to the prepared flange surface to each side of the interface or to the layer of sealant applied in step b;
h. Attaching the second layer of sheet material such that it overlies the first layer of sheet material;
i. Applying a layer sealant over the second layer of sheet material, the layer of sealant extending over the prepared flange surface to each side of the interface or the sealant applied in step b;
j. Connecting a vacuum source to a space formed about the first layer of sheet material.

Advantageously, the method includes the step of preparing the surface of the bolted flange joint includes the step of repairing the bolted flange joint.

The method may comprise the further step of applying a third layer of sheet material between the first and third layers of sheet material.

The method may comprise the further step of applying a fourth layer of sheet material between the surface of the sealant applied to the prepared surface around the bolted flange joint and the first layer of sheet material.

According to a fourth aspect of the invention there is provided a method of sealing and monitoring a bolted flange joint comprising the steps of applying a bolted flange joint sealing and monitoring apparatus of the first aspect of the invention to a bolted flange joint, and monitoring the status of a vacuum in the bolted flange joint monitoring apparatus.

The method of sealing and monitoring a bolted flange joint may comprise the further step of relaying the detected status of the vacuum to a remote monitoring station.

BRIEF DESCRIPTION OF THE DRAWINGS

In the Drawings, which illustrate bolted flange joints and structures including such joints, and are by way of example.

DETAILED DESCRIPTION OF THE PREFERRED EMBODIMENTS

Figure 1:
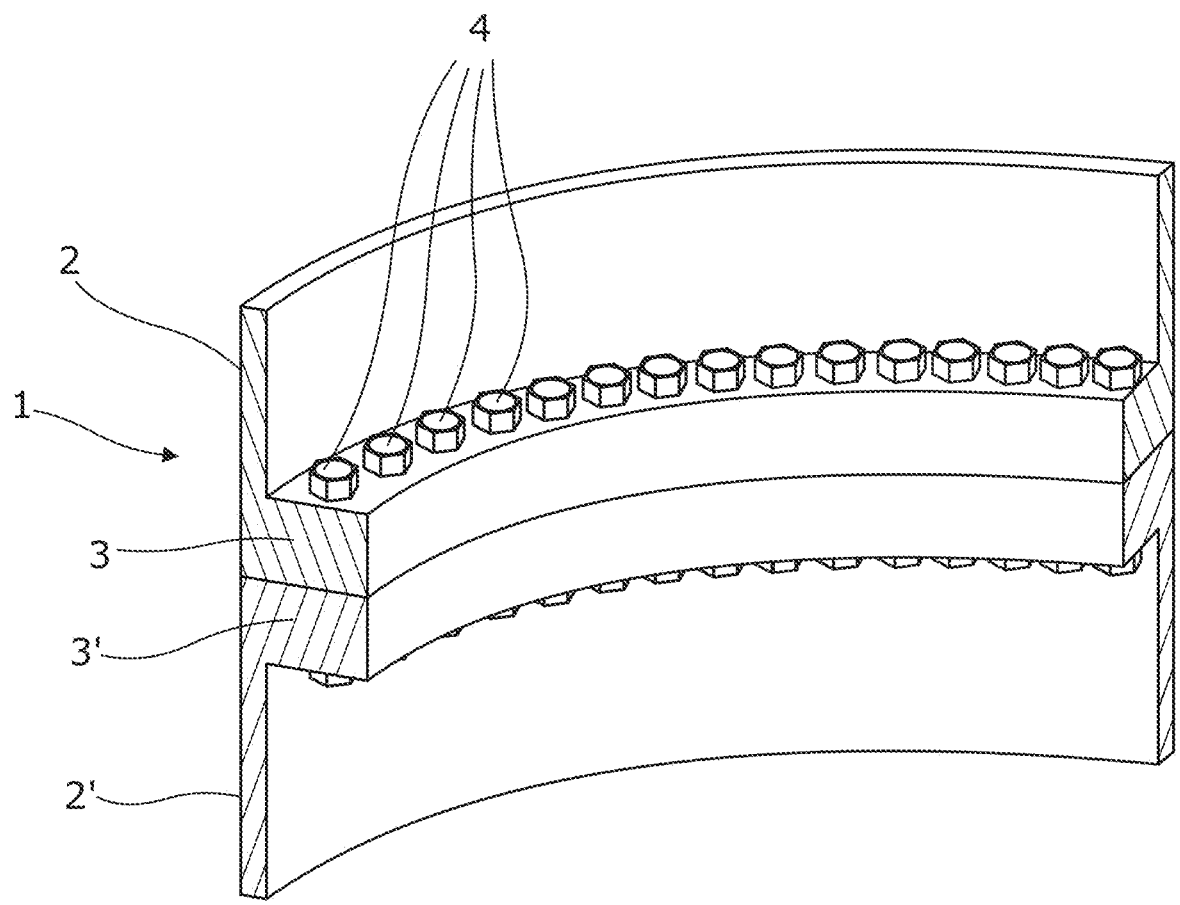
FIG. 1 is a schematic illustration of a part of a bolted flange joint.

Referring now to FIG. 1, a structure 1 comprises two structural elements 2, 2' each including a flange 3, 3'. The flanges 3, 3' include holes (not shown) which are aligned and which receive bolts 4.

Figure 2:
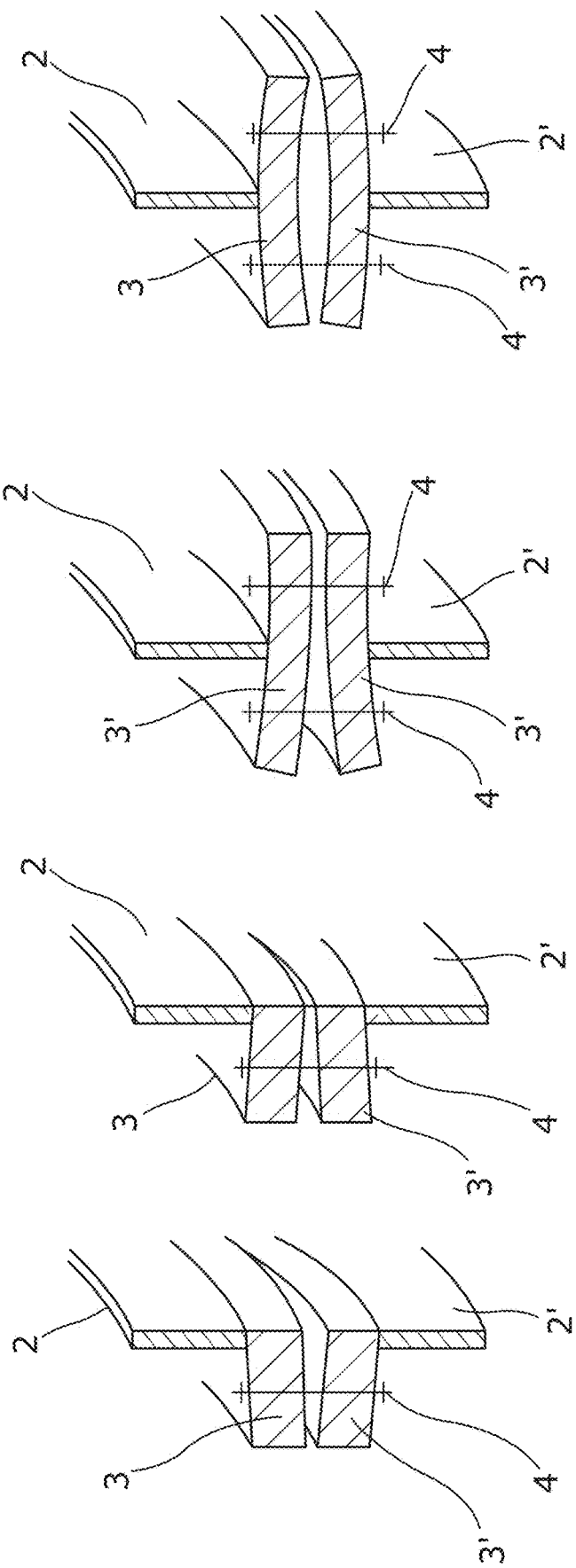
FIG. 2 is a schematic illustration of two types of flange joint.

FIG. 2 illustrates two views of an L-shaped flanged joint and two views of a T-shaped flanged joint. Each view illustrates and exaggerated form of bowing of the flanges 3, 3' representing how the flatness of a flange may deviate from being completely flat. In the case of wind turbine towers, the extent of deviation in flatness may be 2.00 mm over the total circumference and 1.00 mm over a segment of 30 degrees where a particular area of the tower wall is critical.

Figure 3:
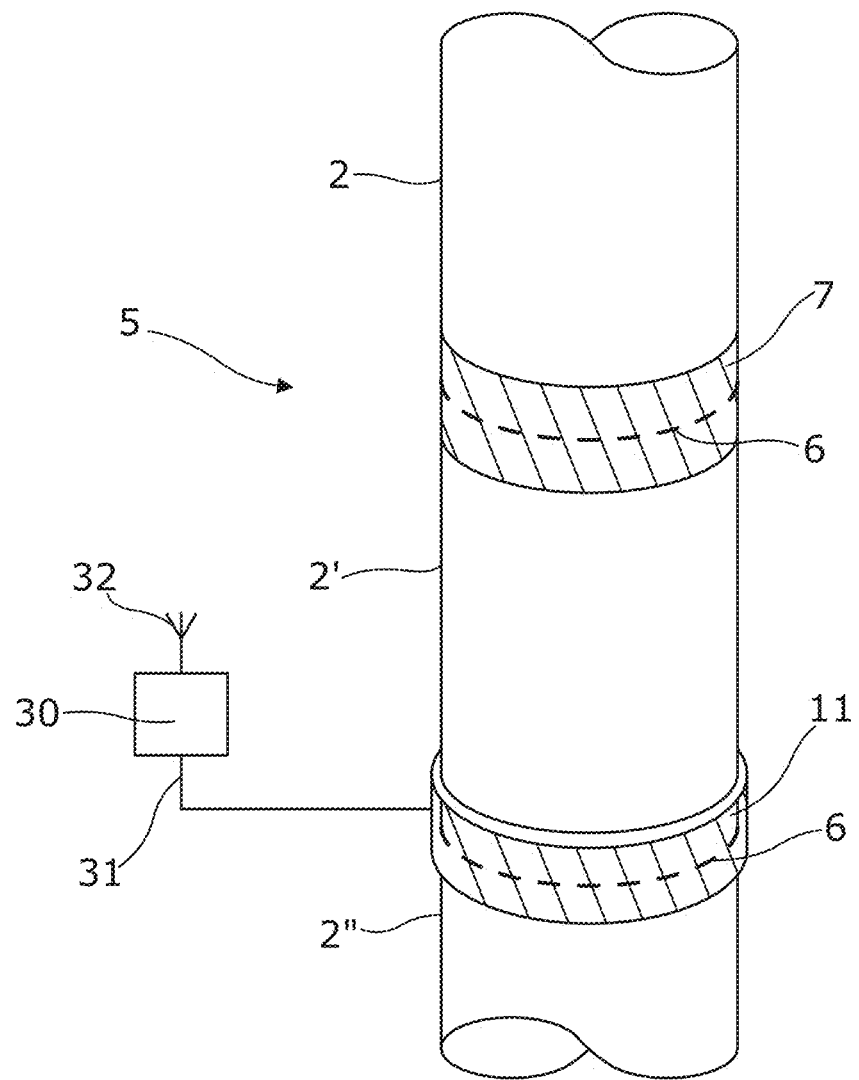
FIG. 3 is a schematic illustration of a wind turbine tower having bolted flange joints and provided with a sealing and monitoring apparatus according to an embodiment of the invention.

FIG. 3 illustrates part of an assembled tower 5, which comprises structural elements 2, 2', 2". Each structural element 2, 2', 2" has flanges 3, 3' (not shown in this Figure but as shown in FIGS. 1 and 2) which form an interface 6 where they abut. The structural elements 2, 2', 2" are joined together by bolts 4 as shown in FIGS. 1 and 2. The interfaces 6 between structural elements 2, 2' is shown enclosed by a collar 7. The function of the collar 7 is to protect the interface 6 from weather. The collar 7 can prevent rain, snow, sea spray, dust and other debris from entering the interface 6. It is desirable to protect the interface 6 from ingress of such matter in order to prevent corrosion of the bolts 4, flanges 3, 3' and the structural elements 2, 2', 2". The collars 7 may be configured such that are removable. For example, the collars 7 may be fastened to the structural elements 2, 2', 2" with screws.

FIG. 3 also illustrates the interface 6 between the structural elements 2', 2" provided with a structure 11, described in greater detail below. The structure 11 may be protected by a collar similar to collar 7. The structure 11 is connected to a vacuum monitoring apparatus 30 by a pipe 31. The vacuum monitoring apparatus 30 subjects the inside of the structure to a negative pressure and monitors that negative pressure constantly. The vacuum monitoring apparatus 30 also includes a transmitter 32 for transmitting data indicative of the status of the negative pressure at a preset sampling rate, for example once a second. The apparatus 30 may also include a data recording means.

As mentioned above, there is a need for an apparatus and method of monitoring the state of the bolts 4 of a bolted flange joint 1, and it would be desirable to monitor the bolts 4 without the requirement to instrument each bolt.

The apparatus of the invention monitors the condition of the bolts 4 by monitoring the status of a vacuum in the region of the bolts 4. If a bolt has failed or stretched by a certain amount a gap will develop between the flanges 3, 3'.

In order to provide a space which can be subjected to a vacuum it is necessary to provide a seal around the bolts 4. This is achieved by sealing the interface 6 on around both the outside and inside of the interface 6.

FIGS. 6a to 6e illustrate different configurations of the invention. Common to each configuration is that the interface 6 is sealed on both the inner and outer surfaces and that one or both of those surfaces is provided with a means of subjecting the joint to a vacuum.

Figure 6A:
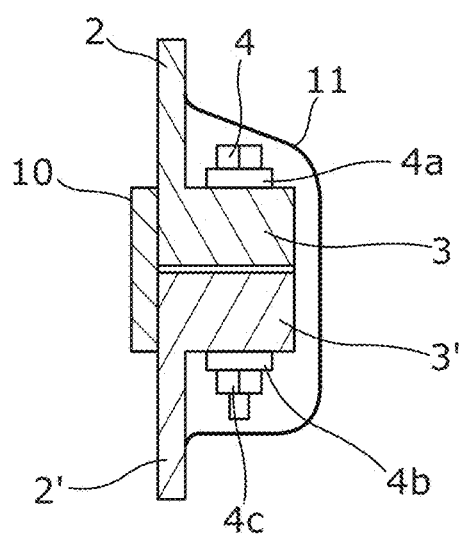
FIGS. 6a to 6e are a schematic illustrations showing different configurations of sealing and monitoring apparatus according to the invention.

The configuration in FIG. 6a Includes a seal 10 on the outer surface of the interface 6. In this embodiment the seal 10 comprises a layer of epoxy resin, such as SikaCor SW-1000 RepaCor, a solvent free, two component coating available from Sika Deutschland GmbH or AB-COR 950 SW-H, a 2 component solvent free epoxy repair and corrosion protection paint available from AB-Polymerchemie GmbH. The inner surface of the interface 6 is provided with a structure 11. The structure 11 extends over the bolts 4 to the inner surfaces of the structural elements 2, 2' to which it is attached. The structure is also attached to the vertical surfaces of the flanges 3, 3'. By sealing the outer surface of interface 6 and encapsulating the inner surface of interface 6 and the bolts to both the upper and lower horizontal surfaces of the flanges 3, 3' the whole bolted flange interface 6 may be subjected to a vacuum. The vacuum will only fail if the 10 or structure 11 fails. If a bolt 4 fractures or is stretched, the structural elements 2, 2' may move relative to one another. If the movement is sufficient to break either the seal 10 or the structure 11, the vacuum will fail and an alarm will be triggered. Given the nature of the structures and the environments in which they are place, it is inevitable that there will be some small movement at the interface 6.

Figure 6B:
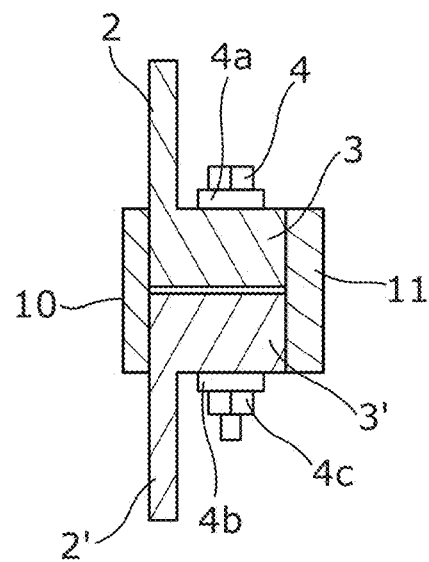

FIG. 6b differs from FIG. 6a in that the structure 11 is attached to and covers the vertical surfaces of the flanges 3, 3' and the bowls 4 are not encapsulated. In this embodiment washers 4a, 4b which are secured between the upper surface of the flange 3 and the head of bolt 4 and the underside of flange 3' and nut 4c respectively, are compressible sufficiently to form an effective seal around the bolt holes.

Figure 6C:
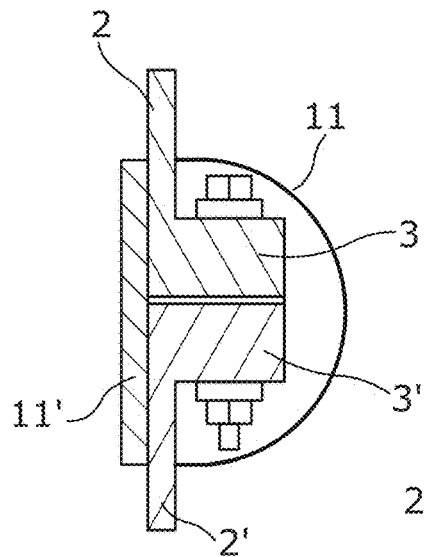

FIG. 6c differs from FIG. 6a in that seal 10 is replaced by a structure 11', so that both sides of the interface 6 are subjected to a vacuum that may be monitored.

Figure 6D:
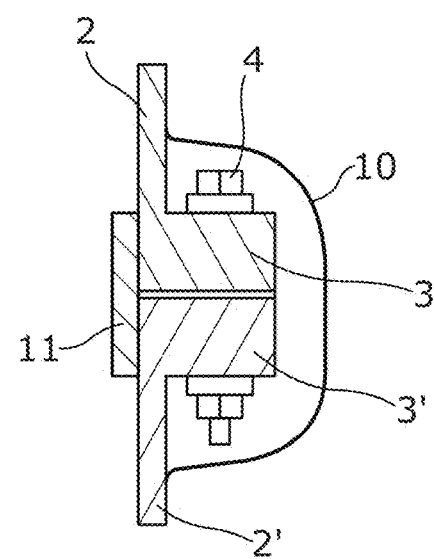

FIG. 6d differs from FIG. 6a in that the structure 11 is attached to the outer surface of the interface 6, with the inner surface having a seal 10 applied thereto.

Figure 6E:
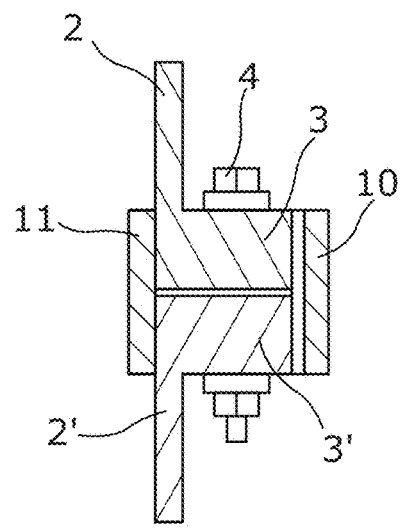

The embodiment of FIG. 6e is most similar to the embodiments of FIG. 6b. However the embodiment of FIG. 6e, the structure 11 is attached to the outer surface of the interface 6, with the inner surface having a seal 10 applied thereto.

Figure 4:
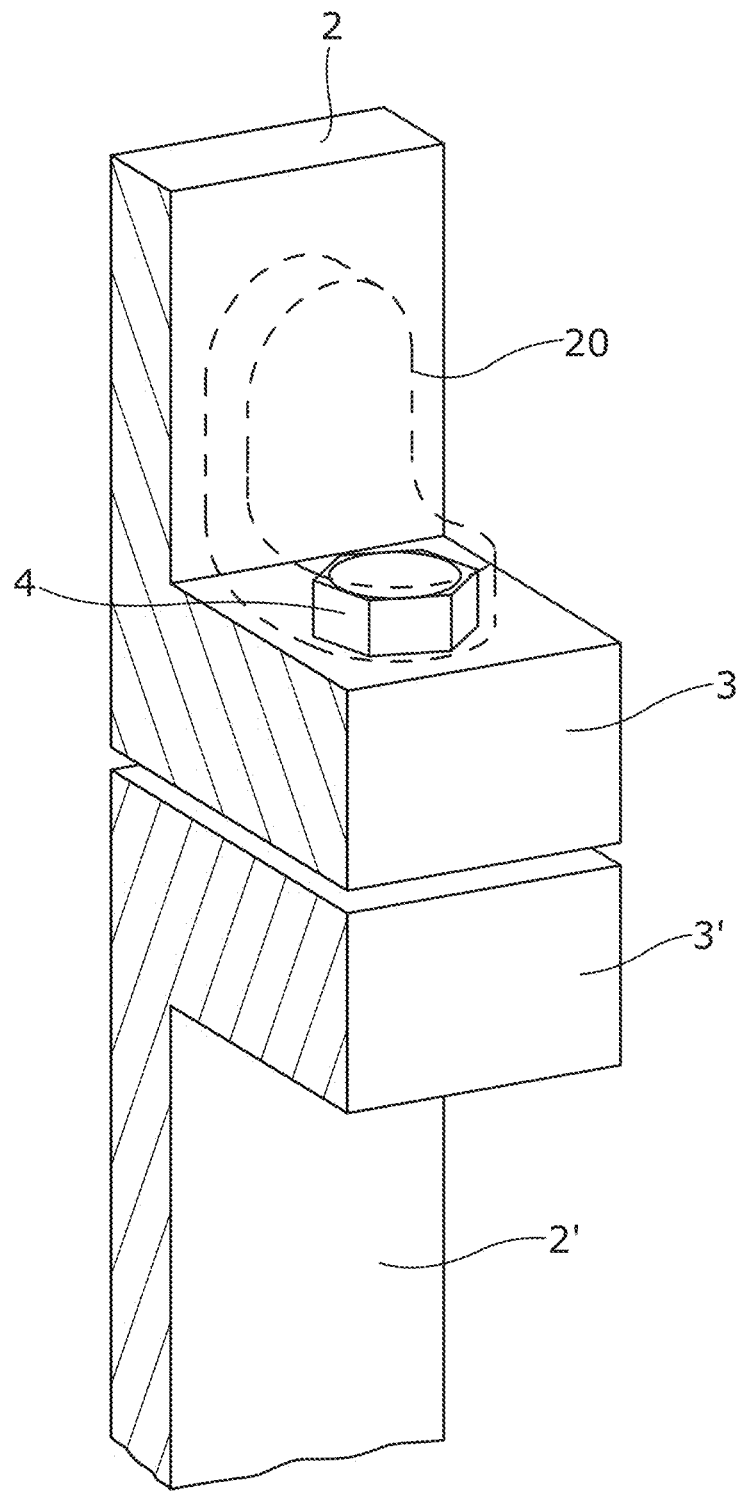
FIG. 4 is a schematic illustration of a part of a bolted flange joint according to an embodiment of the invention.
Figure 5:
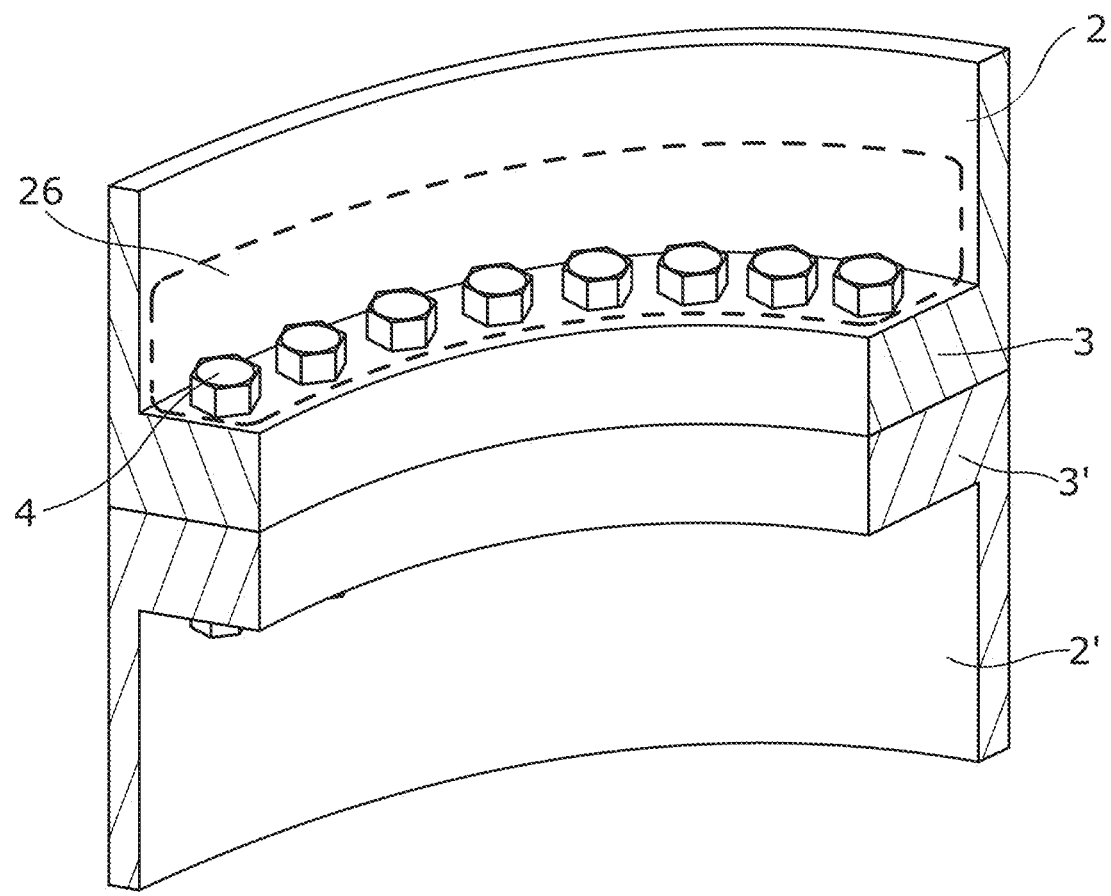
FIG. 5 is a schematic illustration of a part of bolted flange joint according to another embodiment of the invention.

The embodiments illustrated in FIGS. 6b and 6d may be provided with caps to cover and seal the bolts 4 around the bolt heads and the nuts 4c. Two possible forms of cap are illustrated in FIGS. 4 and 5. In FIG. 4 each bolt is provided with its own cap, whereas in FIG. 5 one cap is provided for a plurality of bolts 4. Where such caps are used they would be placed over both the bolt heads and nuts 4c.

Referring to FIG. 4, the individual cap comprises a piece of plastic that is attached to the flange 3' and the inner surface of the structural element 2' by means of adhesive extending around the edge of the plastic 20. The last 20 is then heat sealed, removing air between the plastic, flange 3' and inner surface of the structural element 2' in the process. The seal created by the adhesive 21 is capable of holding the vacuum applied at the interface 6 of the bolted flange joint 1.

Referring to FIG. 5, the cap 25 is a one piece plastic moulding that is shared and dimensioned to surround each bolt head and attach to the inner surface of the structural element 2' and the flange 3' by means of adhesive 26. The adhesive 26 seals any remaining spaced between the underside of the cap 25 and the inner surface of the structural element 2' and the flange 3' against ingress of egress of fluid, that is the seal created by the adhesive 26 is capable of holding the vacuum applied at the interface 6 of the bolted flange joint 1.

Figure 10:
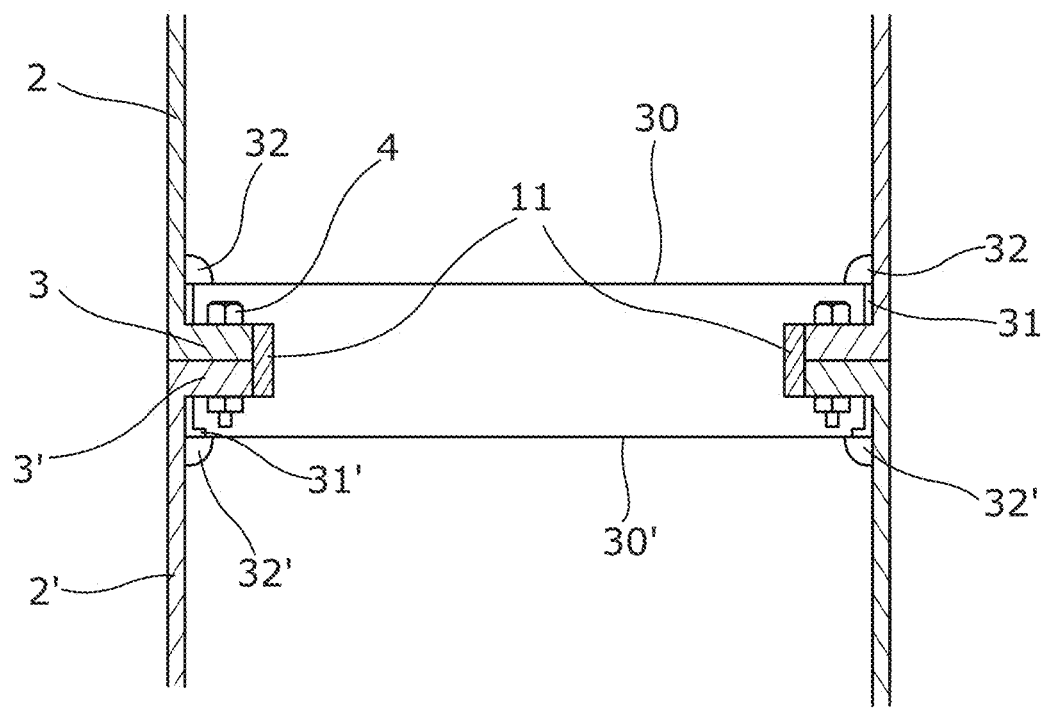
FIG. 10 is a schematic representation of an alternative embodiment of the invention.
Figure 11:
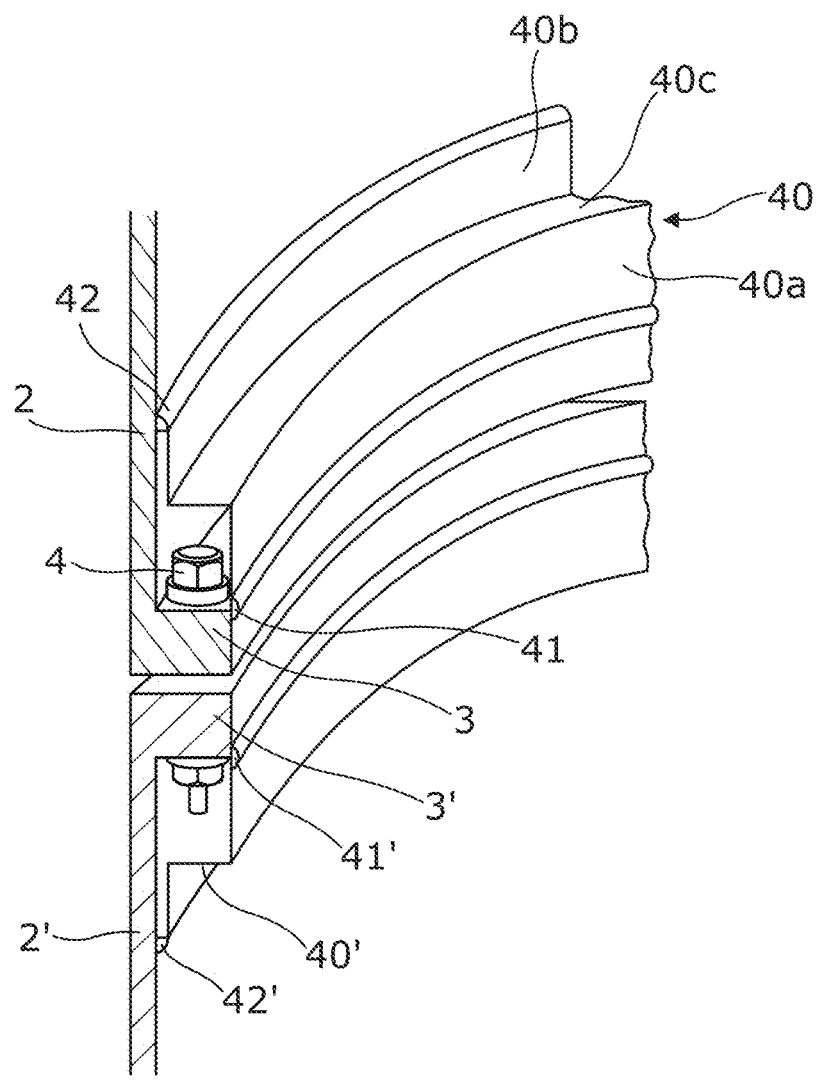
FIG. 11 is a schematic representation of a further alternative embodiment of the invention.
Figure 12:
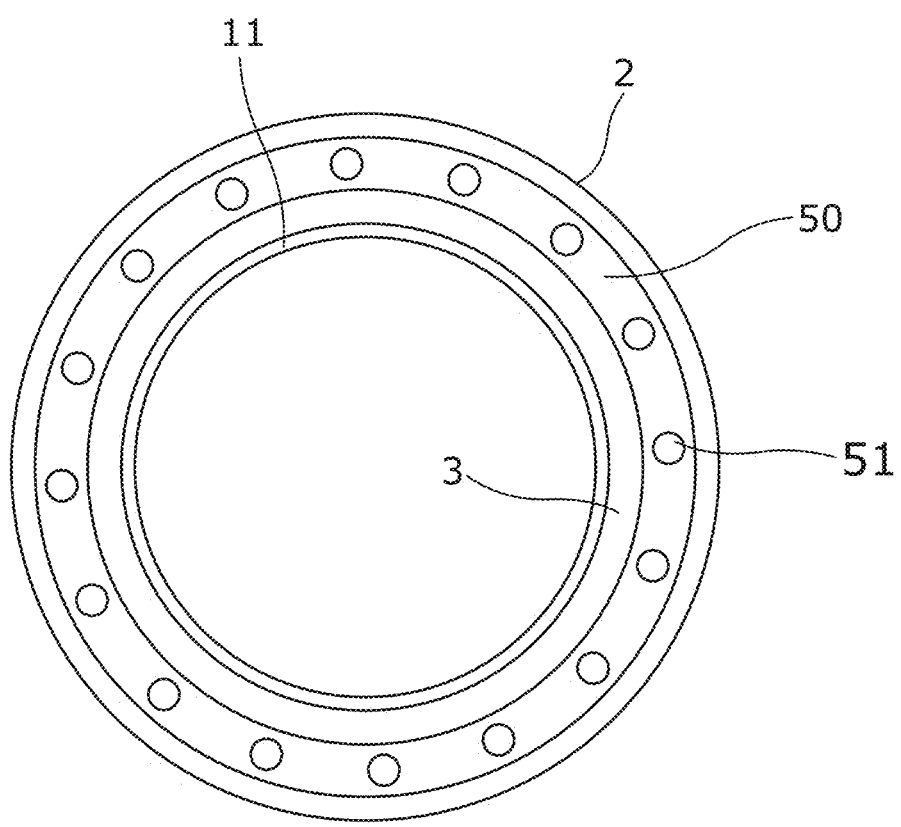
FIG. 12 is a schematic representation of a further alternative embodiment of the invention.

FIGS. 10 to 12 illustrate alternatives to the embodiments show in FIGS. 4 and 5. The embodiment illustrated in FIG. 10 includes plates 30, 30' whose shape corresponds to the internal shape of the structural elements 2, 2' (typically circular). The plates 30, 30' are attached to the inner wall of the structural elements 2, 2' by brackets 31, 31'. The interface of the edge of the plate 30, 30' with the inner surface of the structural element 2, 2' is sealed with a suitable sealant, for example a mastic or a silicone sealant 32, 32' which may be applied in a bead using a commonly available sealant applicator.

The function of the embodiment of FIGS. 10 (and 11) is to prevent the vacuum created in the structure 11 failing due to ingress of air through the bolt holes in the flanges 3, 3'. The plates 30, 30' provide a sealed space so that if there is an air pathway through the bolt holes, there cannot be ingress of air into the space between plates 30, 30'.

The embodiment illustrated in FIG. 11 addresses the same issue as the embodiment of FIG. 10 in a slightly different way. In this embodiment rings 40, 40' which each comprise two flanges 40, 40b extending in the longitudinal direction of the structural elements 2, 2' joined together by a flange 40c perpendicular to the flanges 40a, 40b. The shape of the rings 40, 40' corresponds to the internal shape of the structural elements 2, 2' are attached to the said inner surfaces of the structural elements 2, 2'. In the illustrated example they are held in place with an adhesive sealant, but brackets similar to brackets 31 in FIG. 10 may be provided. The edges of the flanges 40a, 40b, are sealed with a sealant 41, 42 in the manner described above in relation to FIG. 10. In FIG. 11, for the sake of clarity, the structure 11 is not shown. However, the structure would be attached to the inner faces of the flanges 3, 3' as showing FIG. 10.

The embodiment illustrated in FIG. 12 differs embodiments illustrated in FIGS. 10 and 11 in that the bolt holes in the flanges 3, 3' are sealed by a gasket 50. In use, the bolts 4 are tightened against the gasket and the gasket seals any possible air pathway through the bolt holes.

Figure 7:
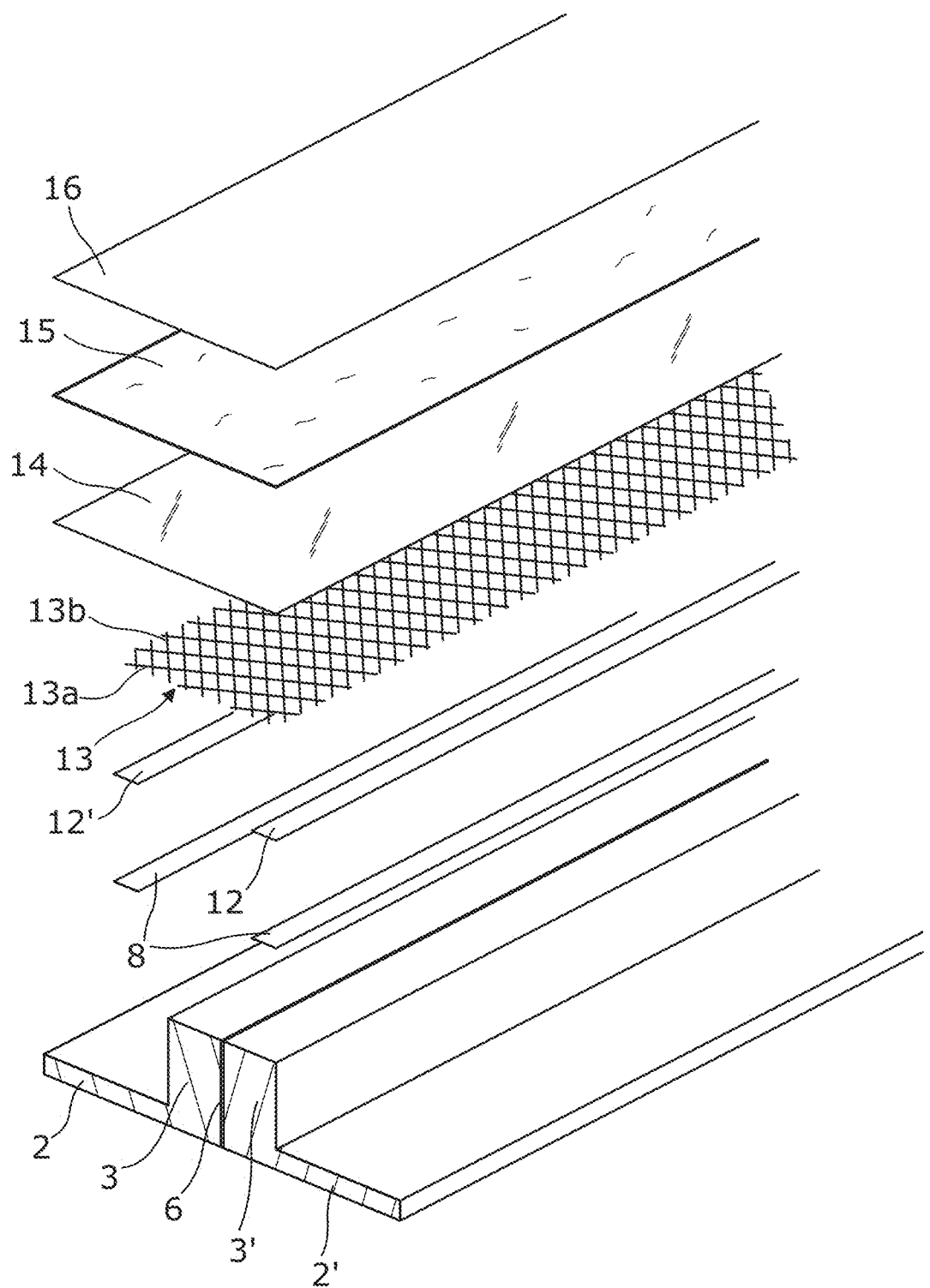
FIG. 7 is an exploded view of the components of the bolted flange sealing and monitoring apparatus shown in FIG. 3.

Referring now to FIG. 7, the area to each side of the interface 6 is prepared back to bare metal and repaired if necessary. This may be done using any know technique. The area prepared back to bare metal extends, for example by 50 mm or the over whole of the vertical surface of each flange 3, 3', to each side of the interface 6. A layer of sealant 8 may then applied to the prepared area around the interface 6. The sealant may be urethane for example, or an epoxy sealant. Advantageously, the sealant is solvent free. The sealant may be a two component sealant that is mixed prior to application, and may be a sealant that requires heating prior to application in order to reduce its viscosity. The sealant 8 provides for better adhesion of an adhesive thereto than bare metal.

The sealant is allowed to cure. A layer of adhesive is attached to the cured sealant 8, or directly to the bare metal where the sealant 8 is not used. In the illustrated example, this is achieved by mounting sheet material 12, such as paper, that is either coated on both sides with adhesive or impreganted with adhesive such that both sides of the sheet material have adhesive properties. The sheet material 12 is attached to the structure both above and below the interface 6, leaving a space in the region of the interface 6.

For ease of use, the sheet material 12 is preferably supplied with peel off layers of material on each side of the material 12. In this way the material 12 may be supplied on a roll without the material adhering to itself. In the illustrated embodiment, the sheet material 12 is in the form of a tape. To apply the sheet material 12 to the cured layer of sealant 8, sheet material 12 in the form of a roll of tape is attached to the structural elements above and below the interface 6.

Instead of using sheet material 12 in the form of a tape, a single piece of sheet material having an opening 12*a* therein may be used. The opening 12*a* may be formed by removing a piece of material from the sheet 12 after is attachment to the structural elements 2, 2', 2", or by using a sheet material 12*a* which has a pre-formed opening therein. This is particularly useful where it is desirable to monitor sections of the joint. Such a configuration allows the section of the joint where a bolt is defective to be identified.

Figure 8:
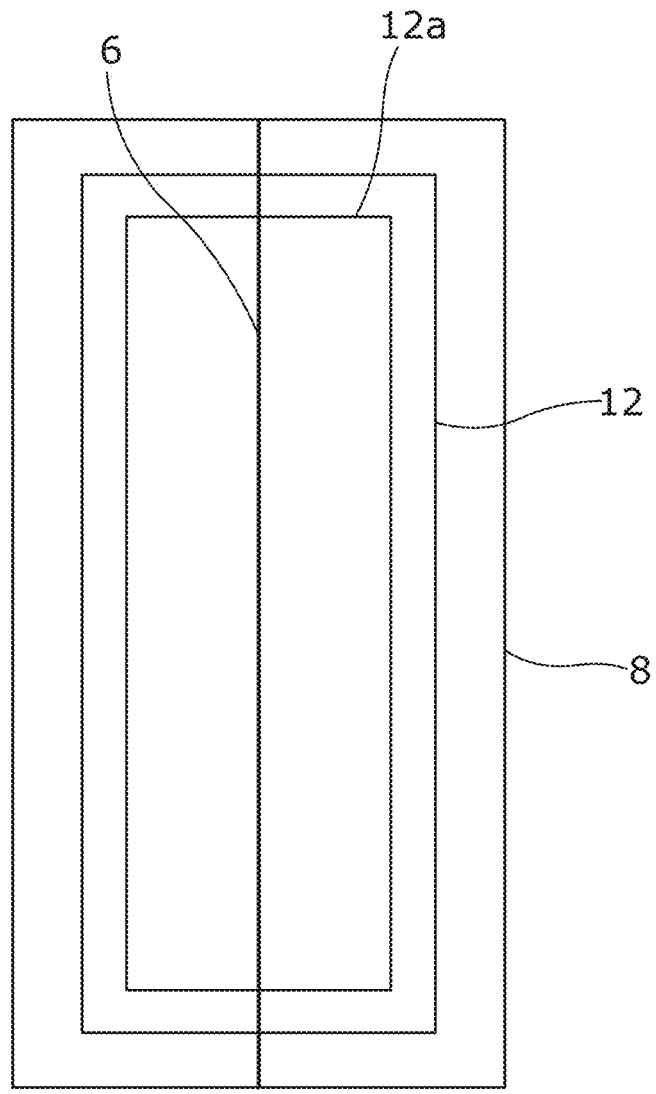
FIG. 8 is a plan view of a weld seam bolted flange joint with some of the components of the bolted flange sealing and monitoring apparatus attached thereto.

To attach the sheet material to the structural element 2, 2', 2", the peel off layer (if provided) is removed from one side thereof, and the material is placed onto the surface of the sealant 8. Where the sheet material is in the form of a tape, the tape is attached to the structural element 2, 2', 2" so as to leave a small area of sealant covered surface to the outside of the tape, that is the other side of the tape to the interface 6. Where a single piece of sheet material 12 is used, it is selected or prepared such that it is slightly smaller than the area covered with sealant 8. Such a pre-formed sheet material 12 is illustrated in FIG. 8, which shows the prepared interface 6, the prepared area around the joint to which sealant 8 has been applied, and the sheet material 12 attached around the interface 6 and on the sealant 8.

If both sides of the sheet 12 were covered with a peel off layer, the remaining peel off layer is removed.

Next a layer of mesh 13 is applied to the adhesive surface of the sheet material 12. The peripheral shape and dimension of the mesh 13 is prepared such that the layer of mesh sits on top of the tape 12 or sheet 12. The peripheral shape and dimension of the mesh 13 may match substantially the peripheral shape and dimension formed by the spaced apart pieces of tape 12 or the sheet 12. It is this mesh 13 that provides the space which may be subject to a vacuum. The mesh is described in greater detail with reference to FIG. 7.

The mesh 13 is next covered with a layer of fluid impervious sheet material, which in the example is a layer of aluminium foil 14. The aluminium foil 14 is prepared such that its peripheral shape and dimension is substantially the same as the shape and dimension of the mesh 13. The aluminium foil is adhered to the mesh 13 with the each edge of the aluminium foil substantially co-terminus with the edge of the mesh 13.

In this example, the aluminium foil has adhesive on one side thereof and is this is covered with a peel off layer. Hence, the peel off layer is removed and the aluminium foil is applied and attached to the free surface of the mesh 13.

The foil 14 is then covered with a layer of cloth 15, which is glass fibre cloth in this example. The cloth 15 is attached to the foil 14 by adhesive, which in the example is provided as a covering to the glass fibre cloth 15. The glass fibre cloth may have a peel off layer covering the adhesive. If so, the peel off layer is removed and the adhesive face of the glass fibre cloth 15 is presented up to and pressed on to the foil 14. The glass fibre cloth is prepared such that its shape and dimension matches the shape and dimension of the foil 14.

The final step in creating the structure 11 involves applying a sealant 16 to the glass fibre cloth 15 and around the cloth 15 over the sealant 8 or bare metal surface around the interface 6. Where the mesh 13 sits on top of the layer of sheet material 12, the sealant 16 seals the edges of the mesh and other layers of sheet material, such that all the components of the structure 10, 10' are encapsulated in the sealant 16. The sealant 16 is preferably the same as or of the same family as the sealant 8. For example, if the sealant 8 is urethane based, it is preferred that the sealant 16 is also a urethane based, whereas if the sealant 8 is epoxy based, it is preferred that the sealant 16 is epoxy based.

Figure 9:
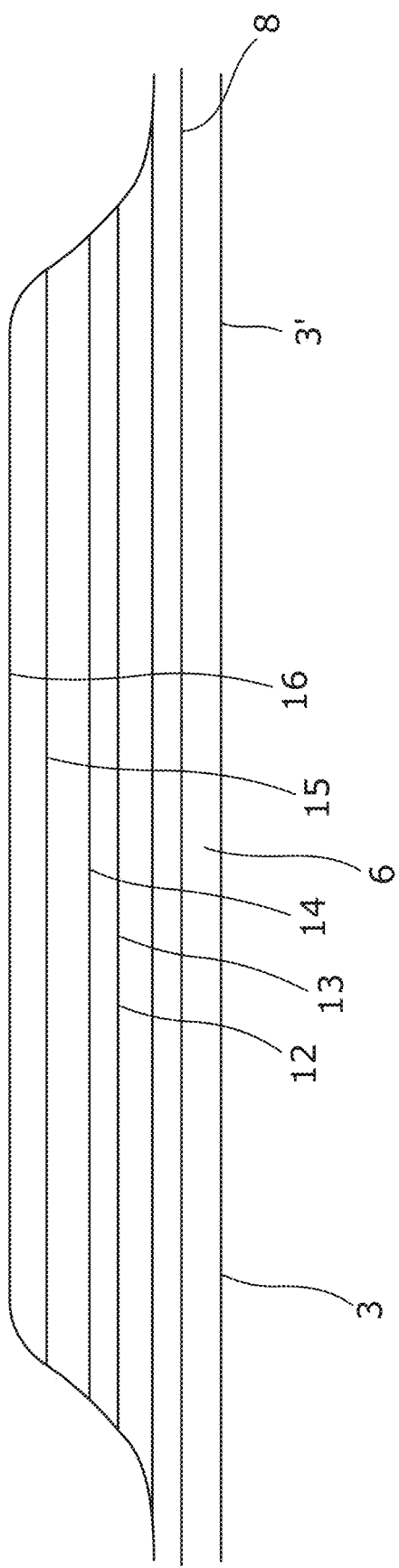
FIG. 9 is a cross-section through a part of the bolted flange sealing and monitoring apparatus.

As can be seen from FIG. 9, the sealant 16 is taken over the edge of the sheet materials 12 to 15 so that the edges thereof are sealed.

Referring to FIG. 7, it can be seen that the mesh 13 is made up of strands of material 13*a* extending in one direction and strands of material 13*b* extending substantially perpendicularly to the strands 13*a*. The strands 13*a* and 13*b* lie in two different planes. Hence, and air space is formed between the lower surface of strands 13*a* and the upper surface of strands 13*b*.

In an alternative embodiment, the mesh 13 is formed such that its peripheral shape and dimension corresponds to the internal shape and dimension between the pieces of tape 12 or of the opening 12*a*. The mesh 13 is then placed within the opening 12*a*. An adhesive may be applied to the sealant 8 or bare metal prior to placing of the mesh 13 thereon. The remaining layers are applied in the same manner as described above. Hence, peripheral shape and dimension of the layer 14 corresponds to the peripheral shape and dimension of the layer 12, and so on.

A vacuum system is connected to the interstitial spaced formed in the structure 11.

The condition of the bolted flange joint 1 is monitored by monitoring the status of the vacuum. If the position of one structural element 2 changes relative to another 2' by a sufficient amount, for example by 1 mm, then a crack will develop in either one of the layers of the structure 11 or in the sealant 10 on the other side of the structural elements, causing the negative pressure in the vacuum to rise and triggering an alarm. The alarm is an indication of one or more defective bolts.

The invention claimed is:

1. The combination of a bolted flange joint sealing and monitoring apparatus and a bolted flange joint, the bolted flange joint comprising two flanges abutting one another at an interface, each flange having a series of holes therein, the holes of the two flanges of the joint aligned and receiving bolts therein, and the abutting flanges providing an inner surface and an outer surface, the sealing and monitoring apparatus including:
   a layer of sealant applied to the interface and an area of the abutting flanges surrounding the interface on at least one of the inner and outer surfaces;
   on at least one of the inner and outer surfaces, a first layer of sheet material adapted to provide an air space and overlying the layer of sealant;
   a second layer of sheet material overlying the first layer of sheet material; and
   a fluid impermeable sealant overlying the second layer of sheet material;
   wherein an air tight space is formed around the first layer of sheet material, the apparatus further including a vacuum source, and wherein the said air tight space is in fluid communication with the vacuum source, the apparatus further including vacuum monitoring means configured to monitor the status of a vacuum created in the air tight space.

2. The combination of a bolted flange joint sealing and monitoring apparatus and a bolted flange joint according to claim 1, further including a third layer of sheet material situated between the first and second layers of sheet material.

3. The combination of a bolted flange joint sealing and monitoring apparatus and a bolted flange joint according to claim 2, wherein the third layer of sheet material is a fluid impervious foil.

4. The combination of a bolted flange joint sealing and monitoring apparatus and a bolted flange joint according to claim 2, wherein at least one face of the third layer of sheet material is covered with adhesive.

5. The combination of a bolted flange joint sealing and monitoring apparatus and a bolted flange joint according to claim 2, wherein the peripheral edge of the third layer of sheet material is one of: co-terminus with the peripheral edge of the first layer of sheet material; and extends beyond the peripheral edge of the first layer of sheet material.

6. The combination of a bolted flange joint sealing and monitoring apparatus and a bolted flange joint according to claim 3, wherein the foil is one of an aluminium foil, and a plastics foil.

7. The combination of a bolted flange joint sealing and monitoring apparatus and a bolted flange joint according to claim 1, further comprising a fourth layer of sheet material situated between the first layer of sheet material and the flange surface or a layer of sealant on the flange surface, wherein the fourth layer of sheet material is attached to one of the flange surface and sealant by adhesive.

8. The combination of a bolted flange joint sealing and monitoring apparatus and a bolted flange joint according to claim 7, wherein the fourth layer of sheet material is one of: covered on opposing faces thereof with adhesive; and is impregnated with adhesive such that the opposing faces thereof have adhesive thereon.

9. The combination of a bolted flange joint sealing and monitoring apparatus and a bolted flange joint according to claim 7, wherein the peripheral edge of the fourth layer of sheet material is one of: co-terminus with the peripheral edge of the first layer of sheet material; and extends beyond the peripheral edge of the first layer of sheet material.

10. The combination of a bolted flange joint sealing and monitoring apparatus and a bolted flange joint according to claim 1, wherein the second layer of sheet material is a cloth.

11. The combination of a bolted flange joint monitoring apparatus and a bolted flange joint according to claim 10, wherein the cloth is a glass fibre cloth.

12. The combination of a bolted flange joint sealing and monitoring apparatus and a bolted flange joint according to claim 10, wherein one side of the second layer of sheet material is covered with adhesive.

13. The combination of a bolted flange joint sealing and monitoring apparatus and a bolted flange joint according to claim 1, wherein the peripheral edge of the first layer lies inside the peripheral edge of the fluid impervious sealant overlying the second layer of sheet material.

14. The combination of a bolted flange joint sealing and monitoring apparatus and a bolted flange joint according to claim 1, wherein the peripheral edge of the second layer of sheet material is one of: co-terminus with the peripheral edge of the first layer of sheet material; and extends beyond the peripheral edge of the first layer of sheet material.

15. A structure comprising a bolted flange joint, the bolted flange joint comprising two flanges abutting one another at an interface, each flange having a series of holes therein, the holes of the two flanges of the joint aligned and receiving bolts therein, and the abutting flanges providing an inner surface and an outer surface, the sealing and monitoring apparatus including:
  a layer of sealant applied to the interface and an area of the abutting flanges surrounding the interface on at least one of the inner and outer surfaces;
  on at least one of the inner and outer surfaces, a first layer of sheet material adapted to provide an air space and overlying the layer of sealant;
  a second layer of sheet material overlying the first layer of sheet material; and
  a fluid impermeable sealant overlying the second layer of sheet material;
  wherein an air tight space is formed around the first layer of sheet material, the apparatus further including a vacuum source, and wherein the said air tight space is in fluid communication with the vacuum source, the apparatus further including vacuum monitoring means configured to monitor the status of a vacuum created in the air tight space.

16. A structure according to claim 15, comprising a plurality of bolted flange joints, each bolted flange joint comprising two flanges abutting one another at an interface, each flange having a series of holes therein, the holes of the two flanges of the joint aligned and receiving bolts therein, and the abutting flanges providing an inner surface and an outer surface, the sealing and monitoring apparatus including:
  a layer of sealant applied to the interface and an area of the abutting flanges surrounding the interface on at least one of the inner and outer surfaces;
  on at least one of the inner and outer surfaces, a first layer of sheet material adapted to provide an air space and overlying the layer of sealant;
  a second layer of sheet material overlying the first layer of sheet material;
  a fluid impermeable sealant overlying the second layer of sheet material;
  wherein an air tight space is formed around the first layer of sheet material, the apparatus further including a vacuum source, and wherein the said air tight space is in fluid communication with the vacuum source, the apparatus further including vacuum monitoring means configured to monitor the status of a vacuum created in the air tight space, wherein each apparatus provides an isolated air tight pocket.

17. A structure according to claim 15, further comprising bolt hole seal means.

18. A structure according to claim 17, wherein the bolt hole seal means comprises one of: two spaced apart plates situated above and below respective flanges and sealed against the inner surface of the structure, one or more rings sealed against the inner surface of the structure, a gasket or a plurality of washers, and one or more sealed caps.

* * * * *